(12) United States Patent
Jansen et al.

(10) Patent No.: US 9,352,407 B2
(45) Date of Patent: May 31, 2016

(54) THREAD WHIRLING DEVICE AND A TOOL FOR INSTALLING A WHIRLING RING

(75) Inventors: Karlheinz Jansen, Schutterwald (DE); Tobias Fautz, Zell am Hammersbach (DE)

(73) Assignee: WTO WERKZEUG-EINRICHTUNGEN GMBH, Ohlsbach (DE)

( * ) Notice: Subject to any disclaimer, the term of this patent is extended or adjusted under 35 U.S.C. 154(b) by 1429 days.

(21) Appl. No.: 12/972,123

(22) Filed: Dec. 17, 2010

(65) Prior Publication Data

US 2011/0150591 A1     Jun. 23, 2011

(30) Foreign Application Priority Data

Dec. 18, 2009   (DE) .................. 10 2009 059 707

(51) Int. Cl.
*B23G 1/34*     (2006.01)
*B23C 5/26*     (2006.01)

(52) U.S. Cl.
CPC ... *B23G 1/34* (2013.01); *B23C 5/26* (2013.01); *B23C 2220/68* (2013.01); *B23C 2240/04* (2013.01); *B23C 2265/32* (2013.01); *Y10T 409/30056* (2015.01)

(58) Field of Classification Search
CPC .... B23C 2220/68; B23C 5/26; B23C 2240/04
USPC .......... 409/65, 75, 76, 77, 78, 199, 200, 232; 279/93, 94
See application file for complete search history.

(56) References Cited

U.S. PATENT DOCUMENTS

| | | | |
|---|---|---|---|
| 1,674,371 A * | 6/1928 | Nonneman | B23G 1/22 409/74 |
| 3,640,062 A * | 2/1972 | Anderson et al. | 57/88 |
| 4,061,076 A * | 12/1977 | Robertson | 409/232 |
| 4,204,787 A * | 5/1980 | McCray et al. | 409/234 |
| 5,061,129 A * | 10/1991 | Baudermann | 409/234 |
| 5,711,642 A * | 1/1998 | Ball et al. | 409/234 |
| 7,544,020 B2 * | 6/2009 | Emoto et al. | 407/34 |
| 7,584,971 B2 * | 9/2009 | Weller | 279/93 |
| 2008/0264220 A1 * | 10/2008 | Rigolone et al. | 82/118 |
| 2010/0104382 A1 * | 4/2010 | Heinloth et al. | 407/16 |
| 2010/0137117 A1 * | 6/2010 | Tigue et al. | 483/28 |

FOREIGN PATENT DOCUMENTS

| | | | | |
|---|---|---|---|---|
| DE | 102008016636 A1 * | 10/2009 | | B23C 5/006 |
| EP | 1728577 A2 * | 12/2006 | | |
| JP | 09174321 A * | 7/1997 | | |

OTHER PUBLICATIONS

English translation of JP 09-174321, Jul. 1997.*
English translation of EP 1728577 A2, Dec. 2006.*
English translation of DE 102008016636 A1, Oct. 2009.*

* cited by examiner

*Primary Examiner* — Sunil K Singh
*Assistant Examiner* — Alan Snyder
(74) *Attorney, Agent, or Firm* — Michael Best & Friedrich LLP

(57) ABSTRACT

A thread whirling device 1 and a whirling ring 3, corresponding thereto, are presented, in which the whirling ring 3 can be attached in a hollow spindle 11 of the thread whirling device 1 in a simple and reliable manner using a combined bayonet-type and clamping connection.

13 Claims, 12 Drawing Sheets

A-A

THREAD WHIRLING DEVICE AND A TOOL FOR INSTALLING A WHIRLING RING

RELATED APPLICATIONS

Figure 1:
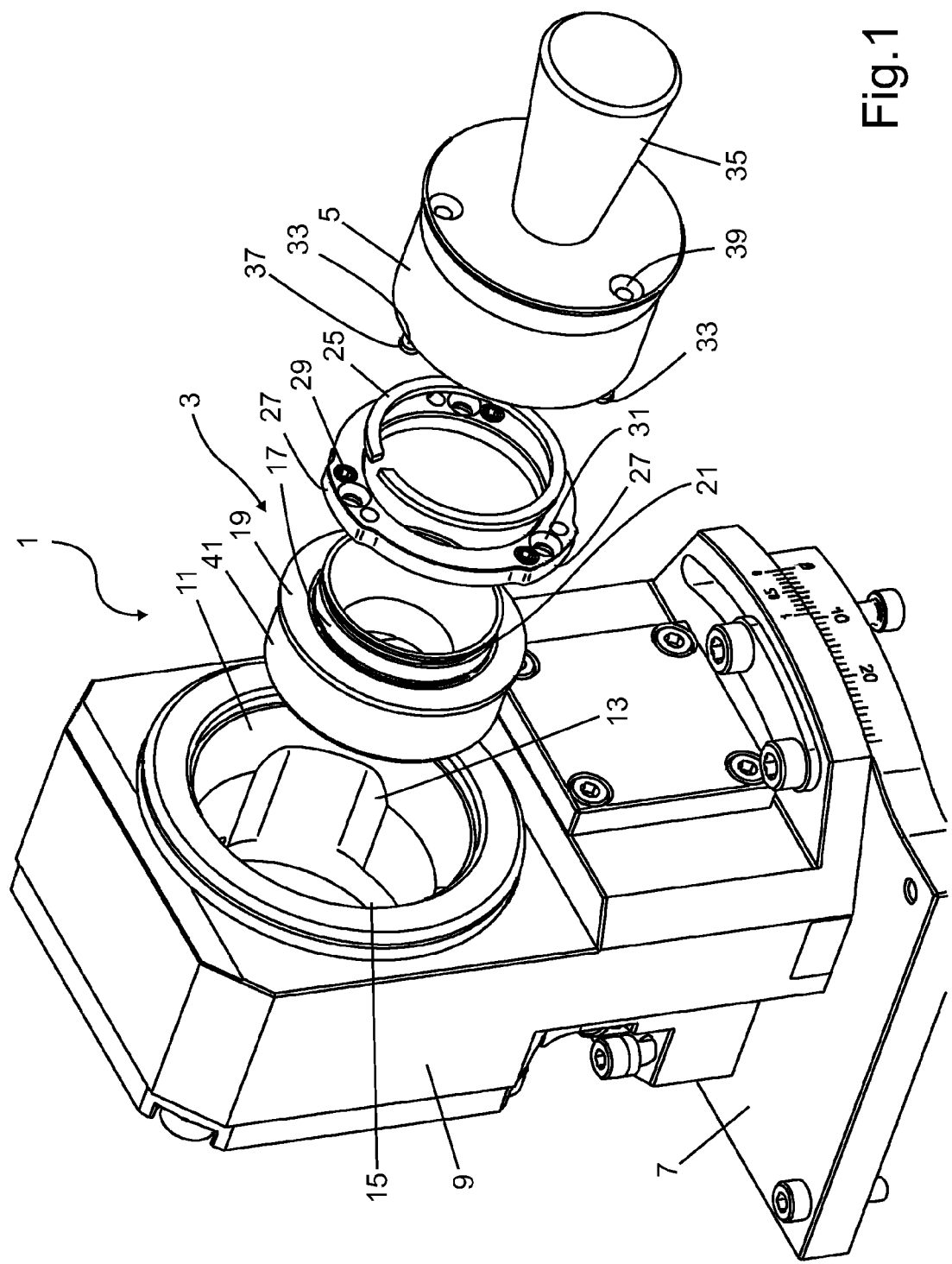

The present application claims priority to German Patent Application No. 102009059707.7, filed on Dec. 18, 2009, the entire content of which is hereby incorporated by reference.

DESCRIPTION

The invention relates to a device for whirling external threads.

Thread whirling is a very efficient method for producing threads or work pieces having spiral-shaped geometry, such as modular worm gears, extruder worm gears, screws, and rotors of screw-type compressors. This is especially the case if the work pieces must be manufactured from hard materials such as titanium or high-grade steel. Thus nowadays virtually all bone screws are manufactured by thread whirling. In this context, the work piece is clamped in the spindle of a machine tool, such as an automatic lathe. During the whirling, the spindle slowly rotates along with the work piece. The axial feed motion of the rotating work piece is generated according to the machine design by the work piece, by the device, or by a combination of both movements, and in this way the spiral slope is achieved.

The cutting motion is executed by a whirling ring, which is rotatably supported in a hollow spindle of the thread whirling device. The whirling ring is driven by the hollow spindle. The whirling ring rotates during the milling at a high rate of speed, resulting in a high cutting velocity, which has a positive effect on the cutting capacities and the surface quality of the milled thread.

Through the combination of spindle rotational speeds and hollow spindle rotational speeds, the manufacturing process can be adjusted to the requirements of the work piece and of the cutting tools.

Because the cutting plates that are arranged on the whirling ring are subject to wear, it is necessary from time to time to replace the whirling ring with one that has new cutting plates. In order to speed up this process, it is proposed to remove the entire whirling ring from the hollow spindle and to replace it with another whirling ring having new cutting plates. The removed whirling ring can then be furnished with new cutting plates.

In the thread whirling devices that are currently available on the market, the whirling ring is connected to the hollow spindle via a flange connection and front-end bolts. Due to restrictive design conditions, such as the relatively small amount of space available in an automatic lathe and the design of the whirling ring as required by the milling method, changing the whirling rings remains a very time-intensive activity. Generally speaking, in the known solutions, the whirling ring is accessible only from the processing side. In so-called automatic lathes, it is then frequently necessary to remove the entire thread whirling device from the machine tool. This procedure is very cost-intensive because it results in long idle times and therefore a non-optimal capacity utilization of the machine tool.

In addition, it is desirable that the device be conceived in such a way that the replacement be carried out via the so-called fantail, in one design from the processing side, and in another design from the side opposite the processing side.

The invention is based on the objective of providing a thread whirling device that makes it possible to replace the whirling ring easily and quickly. In addition, the space requirements for replacing the whirling ring are minimized so that the whirling ring can be replaced without requiring that the thread whirling device be removed from the machine tool.

This objective is achieved according to the invention in a thread whirling device that includes a rotatably supported and driven hollow spindle and a whirling ring that is arranged within the hollow spindle in such a way that the hollow spindle and the whirling ring are connected to each other by a bayonet-type connection.

A bayonet-type connection is characterized by two components, here the whirling ring and the hollow spindle, being able to be joined to each other through two joining movements. In general practice, the joining movements are executed one after the other. The prior art shows a multiplicity of designs for bayonet-type connections, all of which in principle are suitable for use in the device according to the invention. One very well known embodiment of a bayonet-type connection that is well suited to the task is known from so-called starters for fluorescent lights. These starters have two cylindrical pins, which at one end have a shoulder. Two curved recesses resembling keyholes are provided within the light fixture. The pins of the starter are inserted into these recesses, and then the starter is rotated. In addition, bayonet designs are also possible that act in the axial direction and that are radially oriented to the outside and/or to the inside. The bayonet can also be designed in such a way that in creating the bayonet-type connection a clamping effect is also achieved at the same time.

Because the whirling ring is designed to be accommodated coaxially in the hollow shaft, in one preferred embodiment of a bayonet-type connection according to the invention, the whirling ring is initially inserted in the axial direction into corresponding axial grooves of the hollow spindle and after reaching a predefined position is then rotated relative to the hollow spindle. This produces a form-locking fit between the hollow spindle and the whirling ring. Of course, the invention is not limited to this design. Restrictions can arise only due to the spatial circumstances within the hollow spindle and on the whirling ring. The bayonet-type connection according to the invention makes possible the rapid replacement of the whirling ring without the worker charged with replacing the whirling ring being able to see into the hollow spindle. In this way, it is possible to replace the whirling ring even if very little space is available in the machine tool without having to remove the thread whirling device from the machine.

To provide a stable and easy-to-service bayonet-type connection, it is provided that multiple lugs, radially pointing to the outside, be provided at least indirectly on the whirling ring, and that the lugs form a bayonet-type connection with correspondingly shaped grooves in the hollow spindle. The geometric or kinematic reversal of this bayonet-type connection is of course also a part of the invention.

In one especially preferred embodiment of the device according to the invention, the lugs are arranged on a bayonet ring, whereby the bayonet ring is rotatably supported on the whirling ring. The bayonet-type connection is achieved in that the lugs of the bayonet ring are inserted into correspondingly shaped axial grooves in the hollow spindle and then the bayonet ring is rotated relative to the hollow spindle until the lugs of the bayonet ring have been accommodated in the corresponding circumferential grooves of the hollow spindle.

In order that the whirling ring within the hollow spindle can be clamped in addition to the form-locking bayonet-type connection, in a further advantageous embodiment of the invention, multiple clamping bolts that can be screwed against a shoulder of the whirling ring are provided in the bayonet ring. Then after the bayonet-type connection has been created between the whirling ring and the hollow spindle it is possible to clamp the whirling ring within the hollow spindle using the clamping bolts and the bayonet ring so that the drive power can be transmitted from the hollow spindle to the whirling ring in a manner that can withstand great stress. As a result of this additional clamping connection, torques can be transmitted from the hollow spindle to the whirling ring in both rotational directions.

If somewhat more installation space is available in the radial direction, then auxiliary means to achieve a form-locking fit are also possible.

In order to ensure that the bayonet ring cannot fall off the whirling ring and be lost, a further advantageous embodiment of the invention provides for securing the bayonet ring against being lost by means of a safety ring, which in turn is accommodated within a corresponding groove on the whirling ring.

In order to be able to insert the whirling ring according to the invention in a simple manner so that the lugs enter the axial grooves of the hollow spindle and then to be able to rotate the lugs of the whirling ring or the bayonet ring relative to the hollow spindle, driver means, arranged on the whirling ring or bayonet ring on the end face, are shaped in such a way that they cooperate with a correspondingly shaped driver means of a tool. Then the whirling ring can be held by the tool and can be inserted into the hollow spindle and removed. The tool therefore serves to insert the whirling ring into the hollow spindle, to generate the bayonet-type connection according to the invention, and when necessary to remove the whirling ring from the hollow spindle.

In practice, single or double truncated-cone-shaped cylindrical recesses in the bayonet ring have served as driver means that cooperate with correspondingly shaped pins in a tool.

In order that the whirling ring, while it is being inserted, be oriented and positioned with the necessary precision within the hollow shaft, it is also provided that the whirling ring be positioned within the hollow shaft by cylindrical contact surfaces, truncated-cone contact surfaces, and/or a planar surface.

In another embodiment of the invention, the whirling ring is attached within the hollow shaft via a polygon connection that results in a form-locking fit and is rotatably fixed. In this way, the polygon connection according to the invention, in contrast to the standard polygon connections, can be configured in a truncated-cone shape not as prismatic but rather as oriented along the longitudinal axis of the hollow shaft. In this way, in addition to torque being transmitted, the whirling ring is centered with the assistance of the polygon connection according to the invention. The result is a very compact design.

The installation and replacement of a whirling ring according to the invention is also simplified by using a tool according to the invention for installing a whirling ring, whereby the tool has multiple driver means that are arranged on a front end. These driver means can be configured as cylindrical pins and can make it possible to grip and hold the whirling ring according to the invention in such a way that the bayonet-type connection between the whirling ring and the hollow spindle can be generated and released using the tool. By inserting the tool according to the invention, it is unnecessary for the worker to grasp the whirling ring manually because he is able to manipulate the whirling ring indirectly. A correspondingly shaped gripping surface or pommel can be provided on the tool according to the invention so that installation and removal of the whirling ring are significantly simplified.

The driver means of the tool can be configured as spring pins, and in one especially preferred embodiment these driver means have a clamping element, in particular an O-ring. Using clamping elements, it is possible to hold the whirling ring on the tool so fixedly that the whirling ring cannot fall off by itself and the joining movements of the whirling ring can be transmitted to it by the tool. In order to release the tool from the whirling ring, a small force that is somewhat greater than the holding force of the spring elements is sufficient. In this way, creating and releasing the bayonet-type connection between the whirling ring and the hollow spindle are much simplified.

In order that the bayonet ring and whirling ring can be clamped in the hollow spindle, in a further advantageous embodiment of the tool according to the invention, it is provided that the tool has longitudinal boreholes, whose hole pattern corresponds to the hole pattern of the clamping bolts within the bayonet ring or the whirling ring, provided that the whirling ring is connected to the tool by the driver means. As a result of this design, it is possible to hold the whirling ring within the hollow spindle using the tool and to screw in the clamping bolts through the longitudinal boreholes using, for example, an Allen key and thus to fixedly clamp the whirling ring in the hollow spindle.

The aforementioned also applies accordingly if a whirling ring is to be released from the hollow spindle. Then the tool having the driver means can be inserted into the whirling ring and the key for releasing the clamping bolts can be guided by the longitudinal boreholes in the tool directly onto the clamping bolts. Thus it is not necessary that the worker see the head of the clamping bolts in order to be able to apply the key because the longitudinal boreholes according to the invention in the tool act as a centering means for the key.

Other advantages and advantageous embodiments of the invention can be derived from the following drawing, description, and patent claims. All features disclosed in the drawing, description, and patent claims can be essential to the invention either individually or in any combination.

DRAWING

FIGS. 1 to 13 depict exemplary embodiments of a device according to the invention for whirling a thread as well as an exemplary embodiment of a tool according to the invention for replacing a whirling ring in various views.

DESCRIPTION OF THE EXEMPLARY EMBODIMENTS

FIG. 1 depicts a thread whirling device 1 according to the invention, a whirling ring 3 according to the invention, and a tool 5 according to the invention in an exploded view. Thread whirling device 1 includes a base plate 7 and a housing 9 that is rotatably arranged on the base plate. Using base plate 7, thread whirling device 1 is attached in an undepicted processing center or automatic lathe. A hollow spindle 11 is rotatably supported in housing 9. The support of hollow spindle 11 within housing 9 is visible in FIGS. 6 to 9. The same applies to a drive of hollow spindle 11.

Within hollow spindle 11, multiple axial grooves 13 are present, of which in the isometric drawing in FIG. 1 only one is visible, and multiple circumferential grooves 15 are present, of which in FIG. 1 also only one is visible. Grooves 13 and 15 are a part of a bayonet-type connection, which can attach whirling ring 3 in hollow spindle 11.

Whirling ring 3 on the non-visible front end in FIG. 1 has multiple cutting plates, which execute the cutting process during the whirling of a thread. At the left end in FIG. 1, whirling ring 3 has a cylindrical segment 41, which functions to center whirling ring 3 in hollow spindle 11.

A cylindrical contact surface 17, a flange surface 19, and a groove 21 are configured on the end face of whirling ring 3 that is visible in FIG. 1. Contact surface 17 provides the rotatable support for a bayonet ring 23.

If bayonet ring 23 is slid onto whirling ring 3, so that it is rotatably supported on contact surface 17, then a safety ring 25 is clamped into groove 21 so that bayonet ring 23 can rotate relative to whirling ring 3 although it is secured against being lost.

Bayonet ring 23 on its external diameter has three lugs 27, which are shaped in accordance with axial grooves 13 on hollow spindle 11 with respect to number and width. Only two lugs 27 are visible in the isometric drawing in FIG. 1. According to the invention, it is possible to attach whirling ring 3 in hollow spindle 11 via bayonet ring 23 on the basis of a so-called bayonet-type connection.

Within bayonet ring 23, a total of three clamping bolts 29 are screwed in. Recesses 31 in the end face of bayonet ring 23 are somewhat offset and recessed in the circumferential direction. For reasons of clarity, not all clamping bolts 29 or all recesses 31 have been provided with reference numbers.

Recesses 31 have a truncated-cone-shaped countersink of relatively substantial dimensions (without reference numeral), and they function as a centering aid for spring pins 33 of tool 5. Tool 5 according to the invention essentially consists in a cylindrical basic member, which can also be designed as a thick-walled tube, and an optional pommel 35. Pommel 35 ultimately functions so that tool 5 can be grasped and manipulated. However, it is also possible to extend the basic member of tool 5 accordingly and to use the basic member as a gripping surface.

On the left end face of tool 5 in FIG. 1, three spring pins 33 are arranged distributed over the circumference. O-rings 37 are attached to spring pins 33 and function as spring elements to connect bayonet ring 23, including potentially whirling ring 3 which may be joined to bayonet ring 23, to tool 5. In this way, it is possible to hold the end face of whirling ring 3 on tool 5 according to the invention and to guide it into hollow spindle 11. Because the worker only has to grasp the whirling ring indirectly, i.e., via the pommel of tool 5, and the pommel is always situated outside housing 9 of thread whirling device 1, the installation of whirling ring 3 using tool 5 according to the invention is greatly simplified. It is therefore possible to use tool 5 to guide whirling ring 3 along with bayonet ring 23 into hollow spindle 11. As soon as the whirling ring has reached its final axial position, lugs 27 are guided into circumferential grooves 15 by rotating tool 5. In this way, the bayonet-type connection is generated between whirling ring 3, bayonet ring 23, and hollow spindle 11.

Within tool 5, three longitudinal boreholes 39 are present, whose hole pattern corresponds to the hole pattern of clamping bolts 29 within bayonet ring 23. If tool 5 having spring pins 33 has been guided into recesses 31 of bayonet ring 23, then clamping bolts 29 are "automatically" located in the extension of longitudinal boreholes 39. It is then clearly possible to guide an Allen key through longitudinal boreholes 39 of tool 5 to the heads of clamping bolts 29 and to rotate clamping bolts 29.

Figure 2:
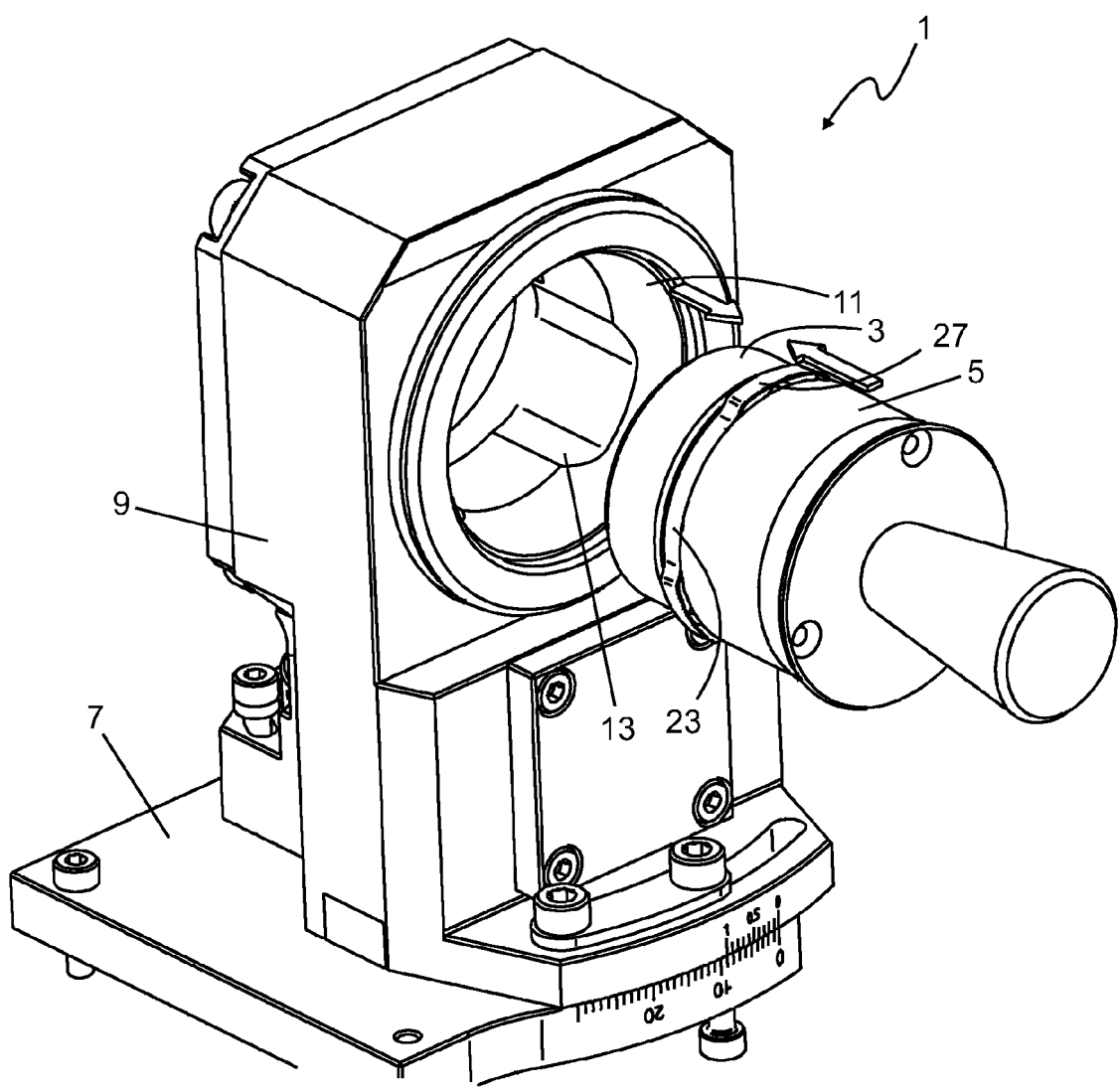

FIG. 2 depicts device 1 according to the invention, along with a whirling ring 3 having a mounted bayonet ring 23, which is held by tool 5 according to the invention. For reasons of clarity, not all reference numerals are reproduced in FIG. 2. In this depiction, it is quite apparent that lugs 27 of bayonet ring 23 may be guided into axial grooves 13 of hollow spindle 11. The directions in which lugs 27 can be guided into and out of axial grooves 13 are indicated by arrows (without reference numerals). From this depiction, it is also apparent that because of tool 5 it is possible to guide whirling ring 3 into hollow spindle 11 very precisely and easily.

Figure 3:
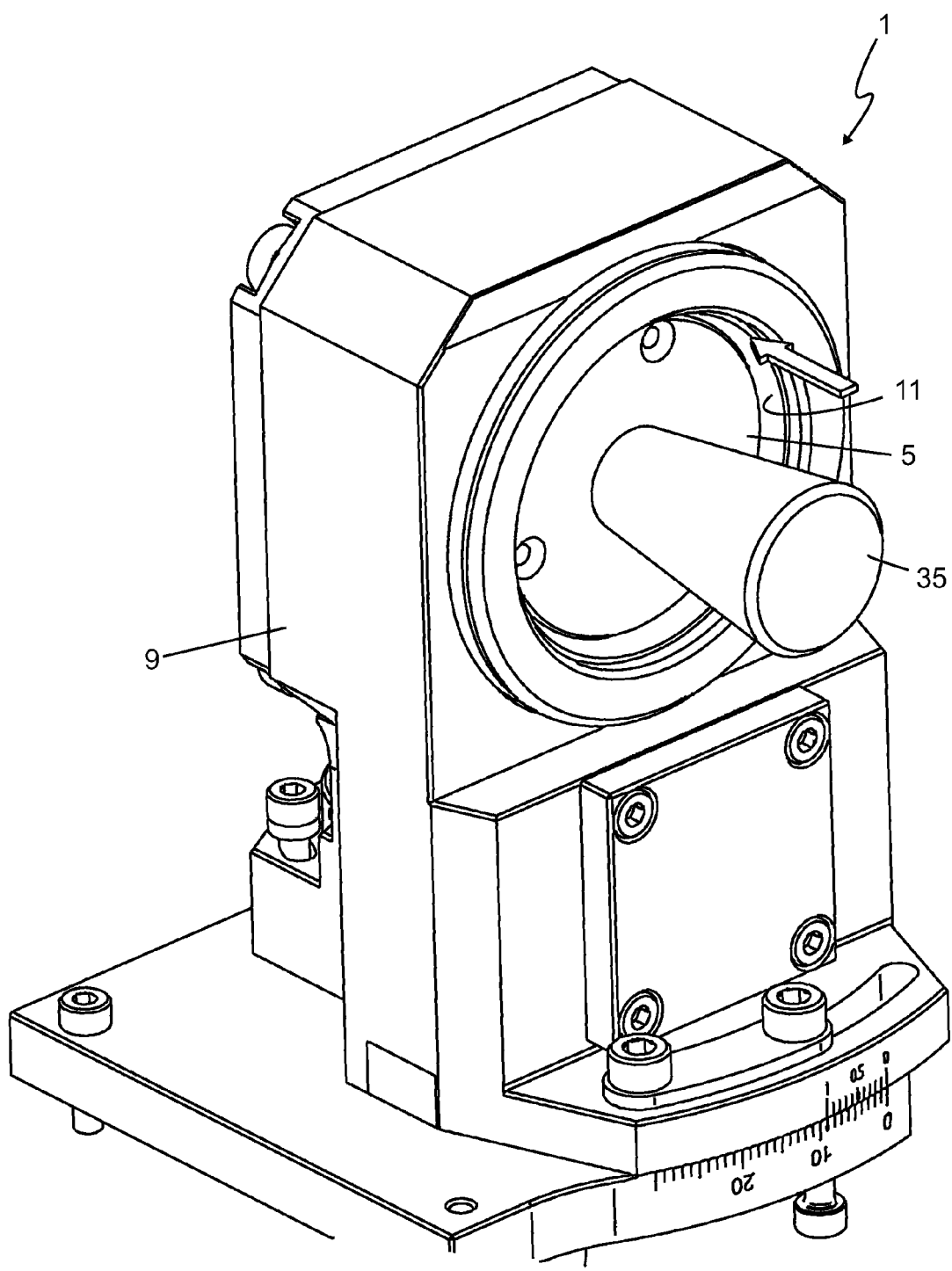

FIG. 3 depicts the situation in which whirling ring 3 has been completely inserted into hollow spindle 11. In this context, it is clear that tool 5 is also located to a large extent within hollow spindle 11 and only pommel 35 protrudes from housing 9. In this state, the first axial joining movement is completed between the whirling ring and hollow spindle 11, and bayonet ring 23 of whirling ring 3 can be rotated clockwise relative to hollow spindle 11.

Figure 4:
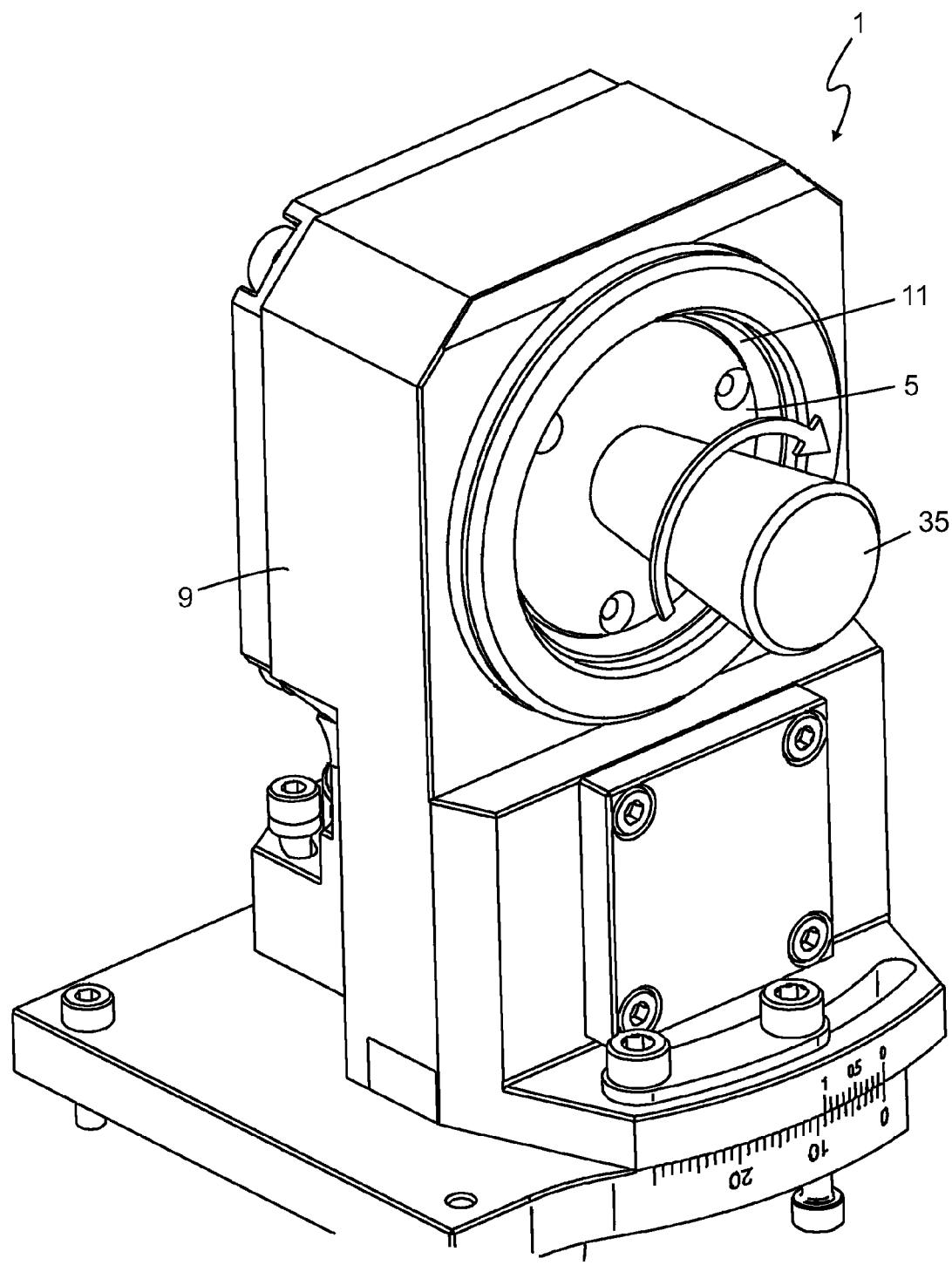

This is indicated by a curved arrow in FIG. 4. In this state, the bayonet-type connection is generated between whirling ring 3 and bayonet ring 23, on the one hand, and hollow spindle 11, on the other hand. Of course, the bayonet-type connection can also be configured so that it functions in counterclockwise fashion.

Figure 5:
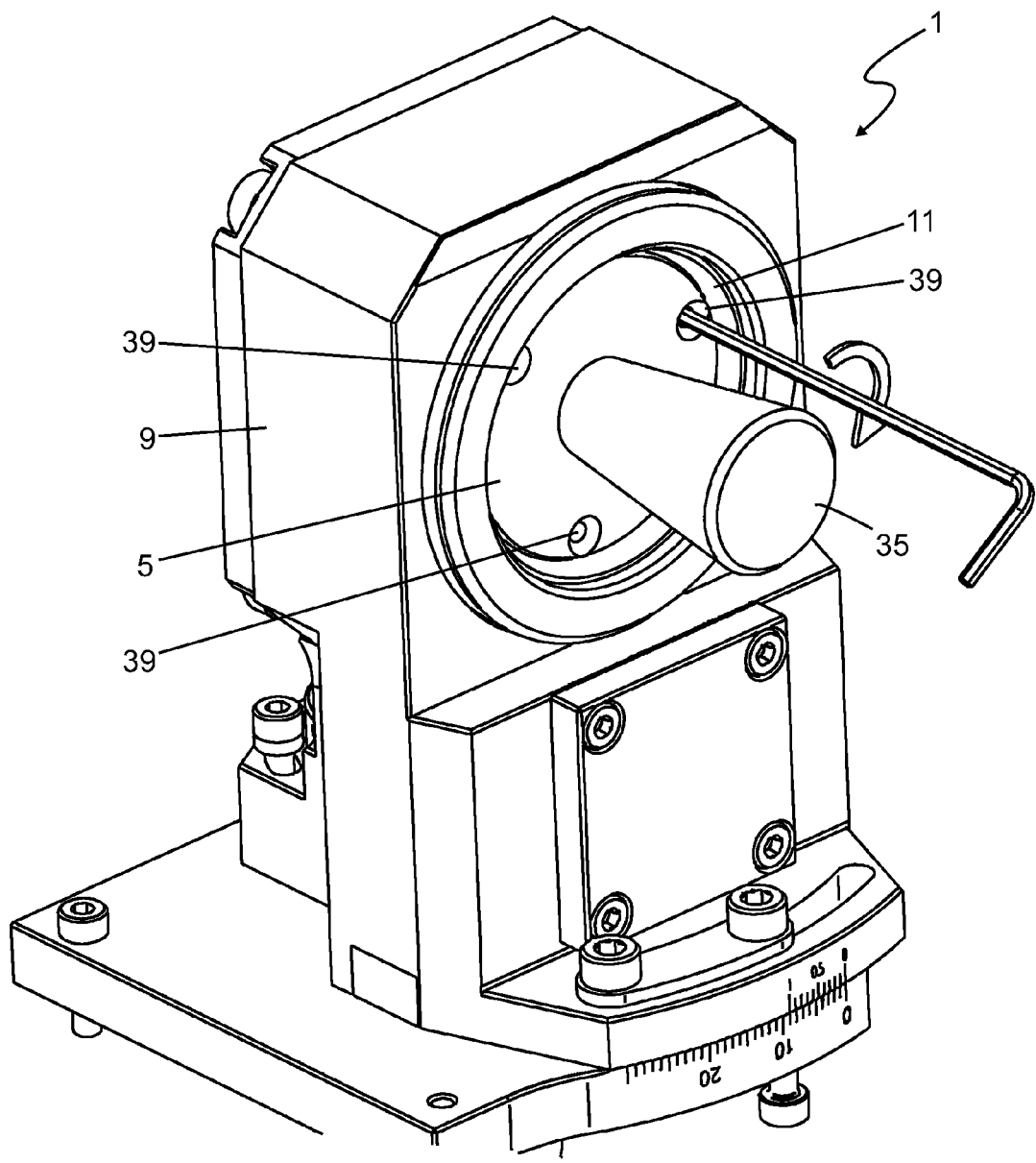

As an additional locking of whirling ring 3, it is possible using an Allen key (not depicted) extending through longitudinal boreholes 39 of tool 5 to tighten clamping bolts 29 in bayonet ring 23 and thereby to move bayonet ring 23 in the axial direction relative to whirling ring 3. This leads to whirling ring 3 and bayonet ring 23 being solidly clamped within circumferential groove 15, and a clamping connection is generated between whirling ring 3 and hollow spindle 11 in addition to the form-locking bayonet-type connection. The screwing in of clamping bolts 29 using a key 43 through longitudinal boreholes 39 is depicted in FIG. 5.

Figure 6:
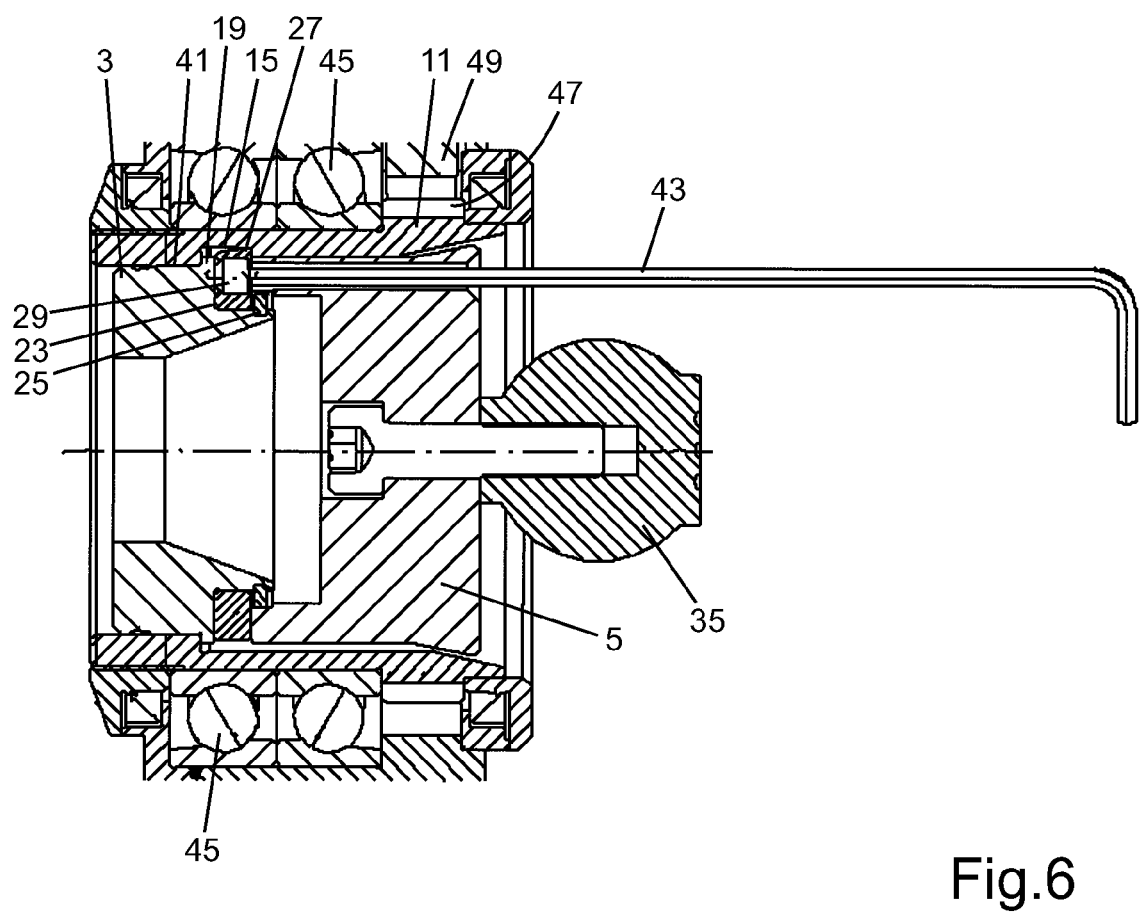

A cutaway view of device 1 according to the invention is depicted in FIG. 6, whereby the sectional plane intersects longitudinal boreholes 39 having an inserted Allen key. The identical components are provided with identical reference numerals, and the aforementioned with respect to FIGS. 1 to 5 applies accordingly.

From FIG. 6, it is clear that whirling ring 3 is radially fixed with its cylindrical segment 41 within hollow shaft 11. In addition, it is also clear that the axial runout of whirling ring 3 is assured by flange surface 19 of whirling ring 3, which cooperates with the shoulder (without reference numeral) in hollow shaft 11.

It is of course also possible, in place of cylindrical segment 41 and a shoulder in hollow spindle 11, to achieve radial runout and axial runout using a truncated cone or a combination of a conical surface and a plane surface, by way of example. It is also possible to position the whirling ring using a polygon connection, which is configured in a truncated-cone shape in the direction of the longitudinal axis of hollow shaft 11 (see FIGS. 10 and 11).

Furthermore, it can clearly be seen in the upper part of FIG. 6, that lug 27 of bayonet ring 23 is accommodated in circumferential groove 15 of hollow spindle 11. If clamping bolts 29 are activated in clockwise fashion using the depicted key 43, then the left end of clamping bolts 29 in FIG. 6 is supported on flange surface 19 of whirling ring 3 and as a result it presses bayonet ring 23 to the right against the right edge of axial groove 13. As a result, whirling ring 3 and bayonet ring 23 within hollow spindle 11 are braced so that a very strong friction-locking connection is achieved between whirling ring 3 and hollow spindle 11. Of course, all clamping bolts 29 distributed over the circumference must be screwed in uniformly.

In FIG. 6, it is also clear that safety ring 25 functions solely to prevent loss. When whirling ring 3 is clamped in hollow spindle 11, safety ring 25 does not transmit any force. The force flow proceeds via whirling ring 3, clamping bolts 29, and lugs 27 of bayonet ring 23.

Tool 5 according to the invention holds whirling ring 3 while the bayonet connection is being generated and while whirling ring 3 and bayonet ring 23 are being subsequently clamped to hollow spindle 11. Tool 5 in response to clamping, on the one hand functions to hold whirling ring 3, and on the other hand to guide key 43 to clamping bolts 29, without the worker having to see clamping bolts 29.

As soon as whirling ring 3 is clamped tight in hollow spindle 11 by screwing in clamping bolts 29 and it is attached in a friction-locking manner, then key 43 and tool 5 can be removed, and device 1 according to the invention is operational.

FIGS. 6 to 9 show the rotatable support of hollow spindle 11 using two grooved ball bearings 45 arranged next to each other. On the right side of grooved ball bearings 45 in FIG. 6, an external tooth system 47 is provided on hollow spindle 11, which meshes with a pinion gear 49. Hollow spindle 11 is driven in this way.

Figure 7A:
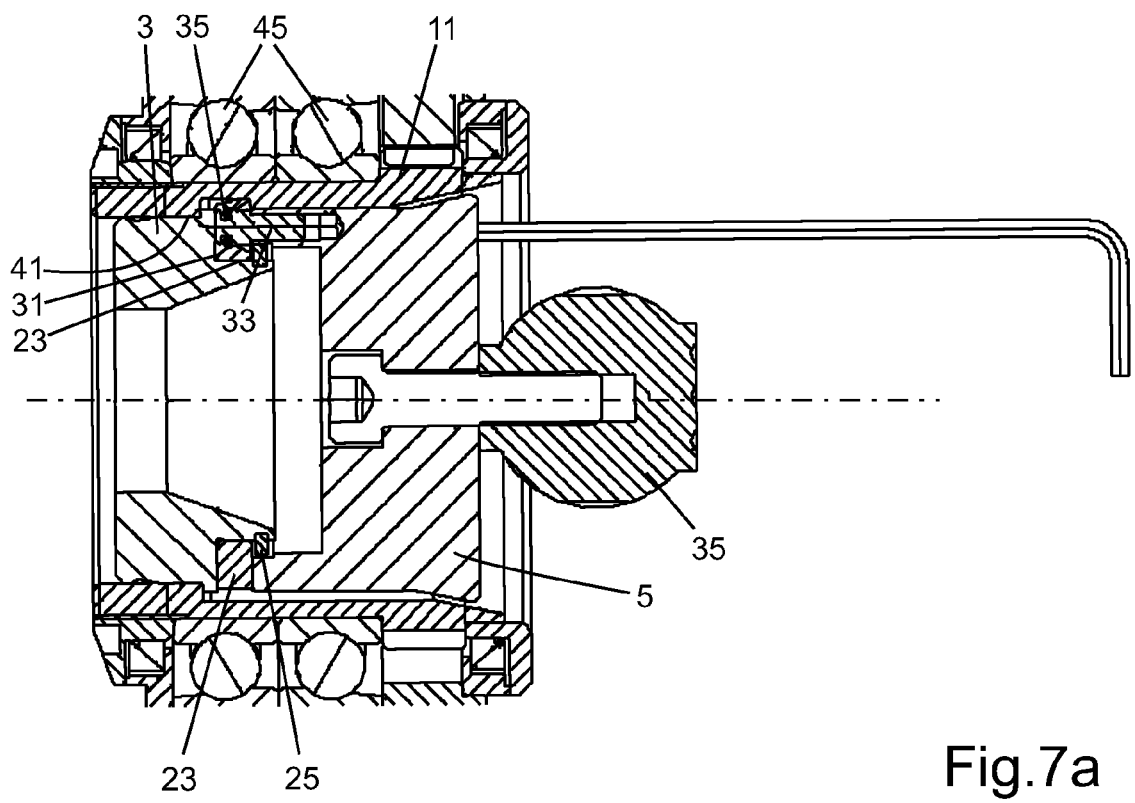

FIG. 7a depicts a cutaway view of hollow spindle 11, whirling ring 3, bayonet ring 23, and tool 5 in a plane running through spring pins 33 and recesses 31.

From this depiction it is clear that recess 31 can also be configured as a double cone so that O-ring 35 must be pressed by a narrow point in the center of the double cone in order for tool 5 to be connected to bayonet ring 23 partially in a form-locking and partially in a spring-like manner. As a result of recess 31, configured as a double cone, a very solid and secure connection can be generated between tool 5 and bayonet ring 23.

Figure 7B:
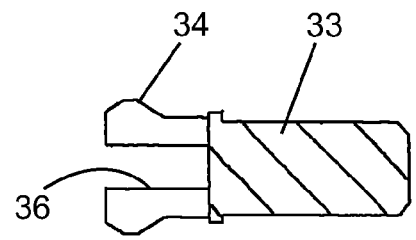

An alternative configuration of a spring pin 33 is depicted separately in FIG. 7b. In this exemplary embodiment, spring pin 33 on its left end in FIG. 7b has a diameter enlargement 34. In addition, spring pin 33 on its left end in FIG. 7b has a slot it in the longitudinal direction (see reference numeral 36), so that spring pin 33 in this area is flexible and/or elastic in the radial direction. Diameter enlargement 34 has a somewhat greater diameter than the smallest interior diameter of recess 31 within bayonet ring 23.

If spring pins 33 according to FIG. 7b are pressed into recesses 31 of bayonet ring 23, spring pins 33 are so flexible in the radial direction that diameter enlargement 34 can pass the narrow point of recess 31 and therefore a partially form-locking fit, a partially force-locking fit, and a detachable connection are created between tool 5, bayonet ring 23, and whirling ring 3.

Figure 8:
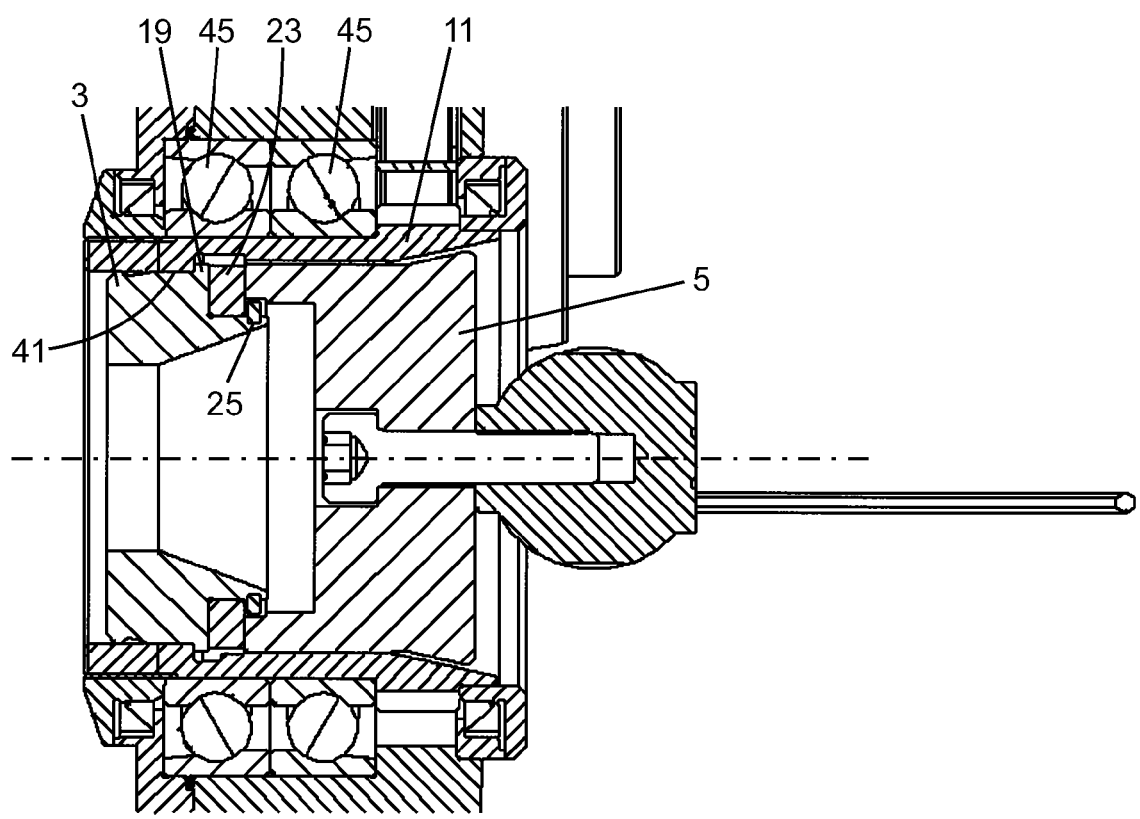

FIG. 8 depicts a cutaway view in which neither pin 33, clamping bolts 29, nor lugs 27 are visible. In this cutaway plane, bayonet ring 23 does not protrude in the radial direction beyond the external diameter of flange surface 19.

Figure 9:
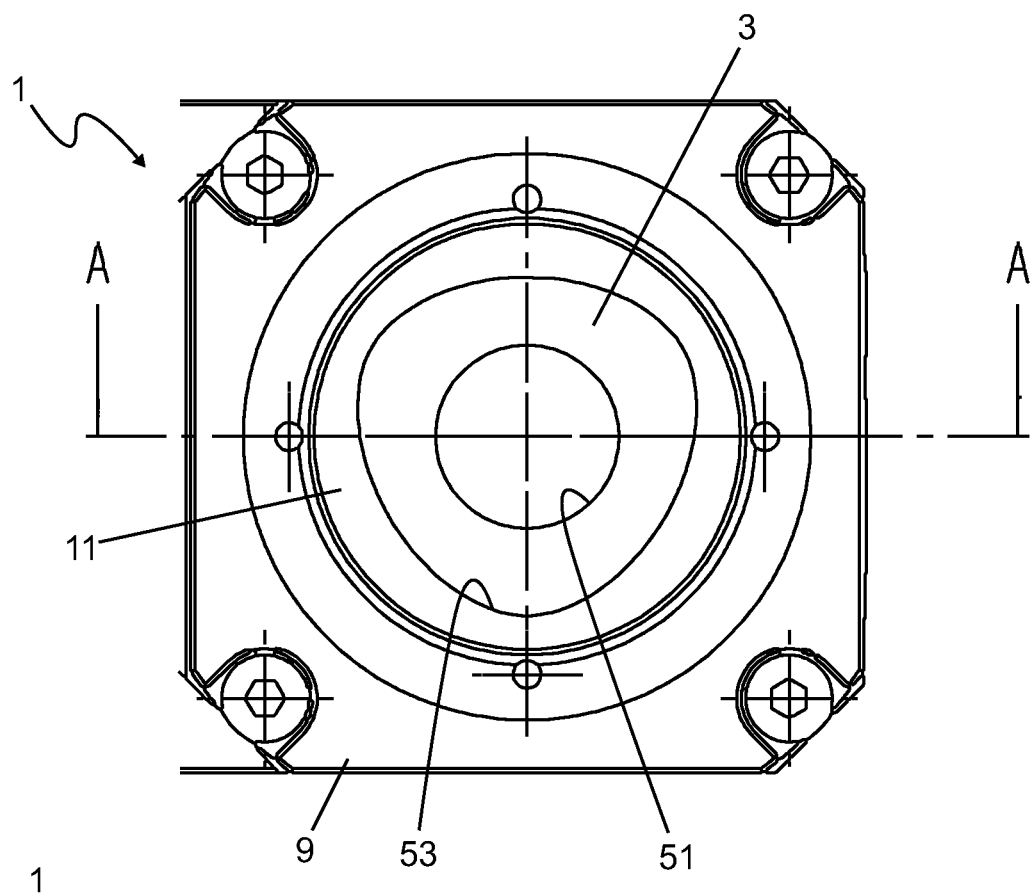
Figure 10:
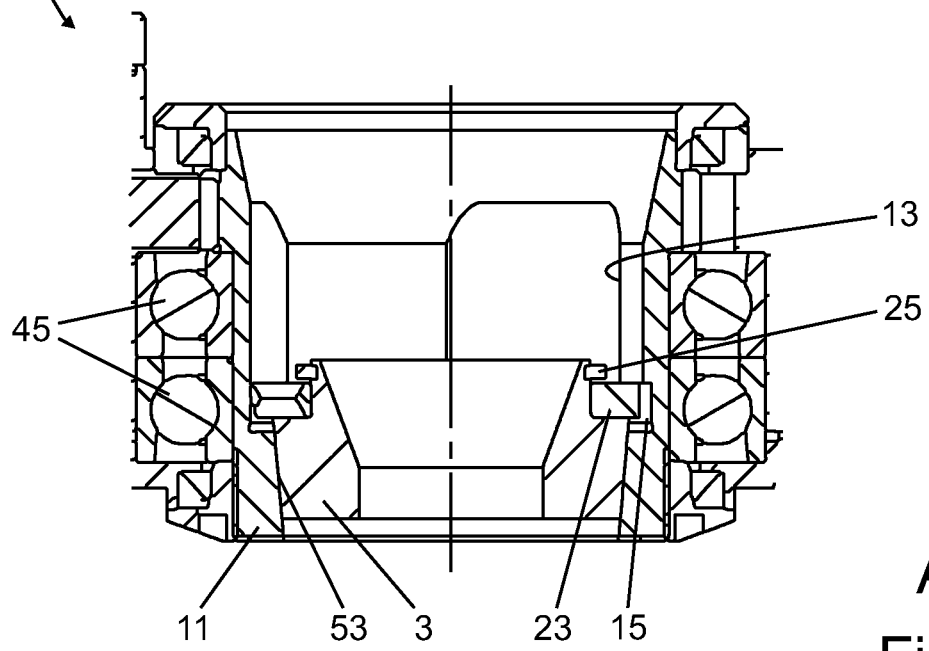

FIGS. 9 and 10 depict a further exemplary embodiment of a thread whirling device according to the invention. FIG. 9 depicts this exemplary embodiment in a front view. With reference to FIG. 6, this would represent a view of thread whirling device 14 from left to right. This front view according to FIG. 9 basically depicts housing 9, hollow spindle 11, and whirling ring 3. The through opening of whirling ring 3, by which the work piece being machine is guided, has reference numeral 51. In this exemplary embodiment, the torque between hollow spindle 11 and whirling ring 3 is transmitted via a cone-shaped polygon connection 53. Polygon connections are very efficient shaft-hub connections for the form-locking transmission of torques and are defined in relevant standards.

Contrary to the standard polygon connections, polygon connection 53 according to the invention, as can be seen from FIG. 10, is configured in conical fashion. FIG. 10 is a cutaway view along the line A-A in FIG. 9. In this connection, the term "conical" indicates that the polygon connection according to the invention is not prismatic, but rather that the "diameter" of the polygon increases in the axial direction of hollow spindle 11 and whirling ring 3.

In this way, conical polygon connection 53 according to the invention can transmit not only the necessary torque between hollow spindle 11 and whirling ring 3, but also can precisely position whirling ring 3 in hollow spindle 11 with respect to the radial and axial runout. Polygon connection 53 according to the invention therefore has a total of three functions.

Whirling ring 3 in this exemplary embodiment is also braced in the axial direction along with the hollow spindle in a bayonet-type connection by means of a bayonet ring 15, and as a result the whirling ring is supported in contact with the polygonal and conical receptacle in hollow spindle 11 according to the invention.

Because polygon connection 53 according to the invention, which is made up of complementary truncated-cone-shaped surfaces having a polygon cross section, takes on not only the transmission of torque but also the positioning of whirling ring 3 with respect to the axial runout and radial runout relative to hollow shaft 11, bayonet ring 23 is only required to ensure that whirling ring 3 is pressed in the axial direction against hollow shaft 11. Therefore, clamping bolts such as are familiar, for example, from the aforementioned exemplary embodiment, become superfluous. It is only important to ensure that the anti-twist protection of bayonet ring 23 is built in. This can occur in the braced state of the polygon connection, for example, by a cotter pin being inserted through bayonet ring 23 and hollow spindle 11, so that bayonet ring 23 can no longer rotate relative to hollow spindle 11. A cotter pin of this type is not depicted in FIGS. 9 and 10. It could be inserted in the axial direction of hollow spindle 11 through hollow spindle 11 into bayonet ring 23. Of course, it would also be possible to hold bayonet ring 23 fixedly using a stud screw (undepicted).

It is also possible to build in additional anti-twist protection between the hollow spindle and the whirling ring. This is possible through the form-locking fit using groove and spring systems or through a polygon-shaped or the non-round shape of the contact surfaces between hollow shaft 11 and whirling ring 23.

Figure 11:
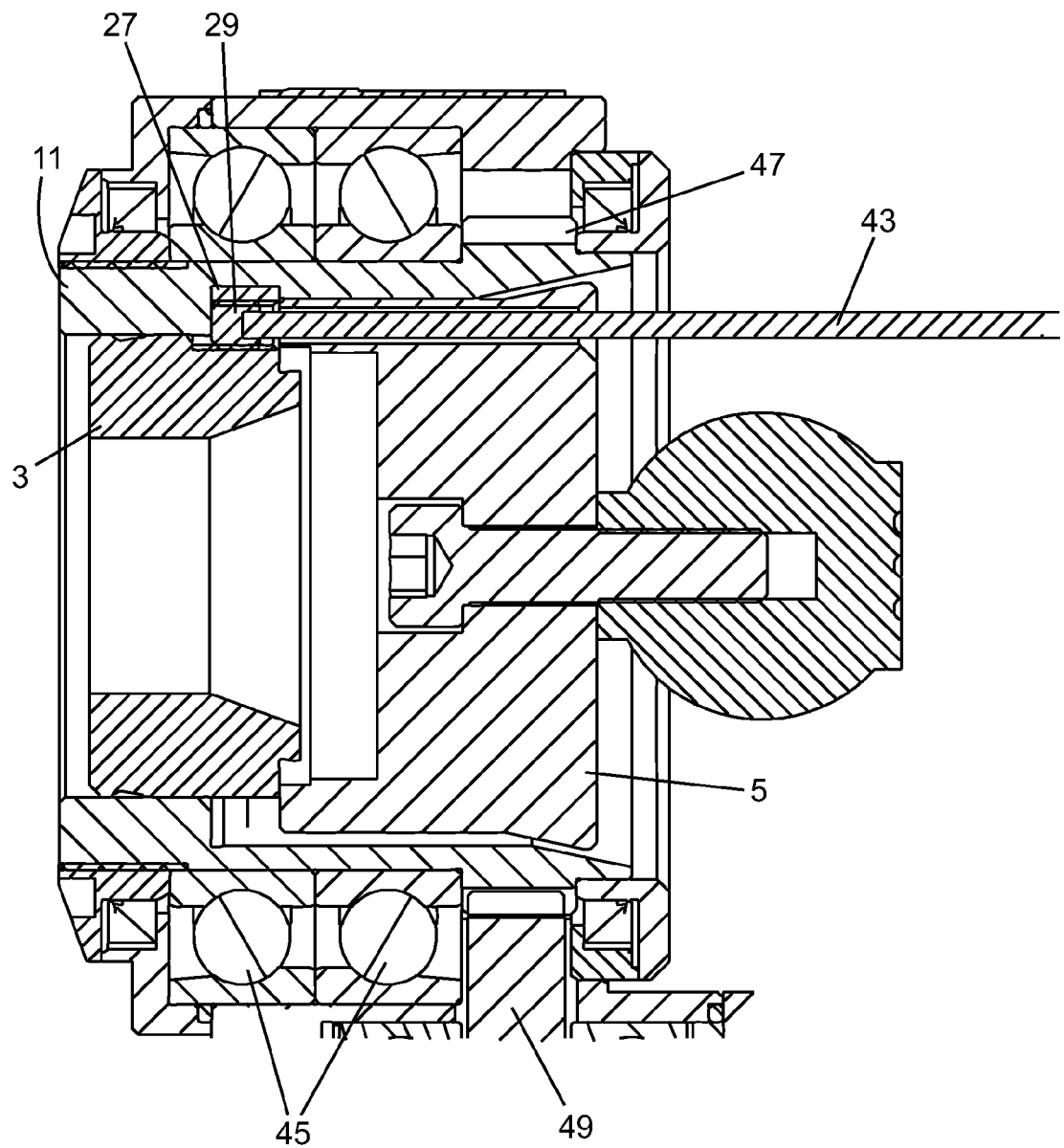

FIG. 11 depicts a further alternative clamping situation without a bayonet ring. In this exemplary embodiment, lugs 27 are a part of whirling ring 3, and clamping bolts 29 are screwed into lugs 27 of whirling ring 3. Accordingly, hollow spindle 11 is displaced somewhat further towards the inside to the left of clamping bolts 29, in order to present a contact surface for clamping bolts 29. If the clamping bolts are now activated using key 43, then lugs 27 along with whirling ring 3 are pressed to the right in FIG. 11 until lugs 27 make contact with the side wall of circumferential groove 15. In this way, whirling ring 3 is also clamped tight in hollow spindle 11, and a precise and reliable accommodation of whirling ring 3 within hollow spindle 11 is made possible. In this context, equal torques can be transmitted between hollow spindle 11 and whirling ring 3 in both rotational directions.

Figure 12:
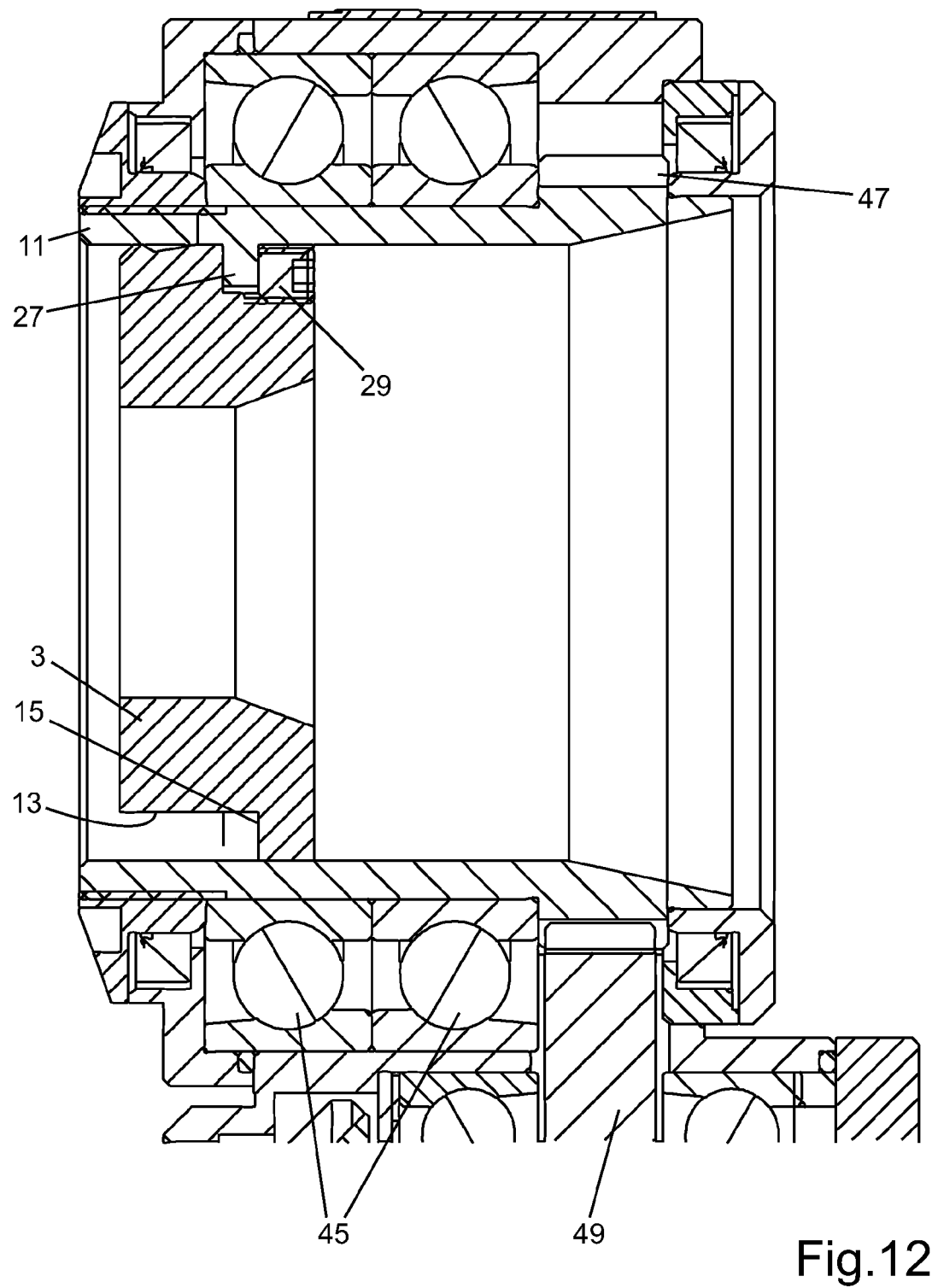

FIG. 12 depicts a further exemplary embodiment of a thread whirling device according to the invention in a longitudinal section. This exemplary embodiment contains a geometric reversal of the bayonet-type connection. As can be seen from FIG. 12, axial grooves 13 and circumferential grooves 15 are parts of whirling ring 3, and lugs 27 are arranged on hollow shaft 11 so as to be pointing radially to the inside. Clamping bolts 29 are arranged in whirling ring 3 and they act directly upon lugs 27 of hollow shaft 11. As a result, whirling ring 3 in FIG. 12 is pulled from the left toward lugs 27. In this way, it is prevented from rotating and is oriented with respect to the radial runout at least.

Figure 13:
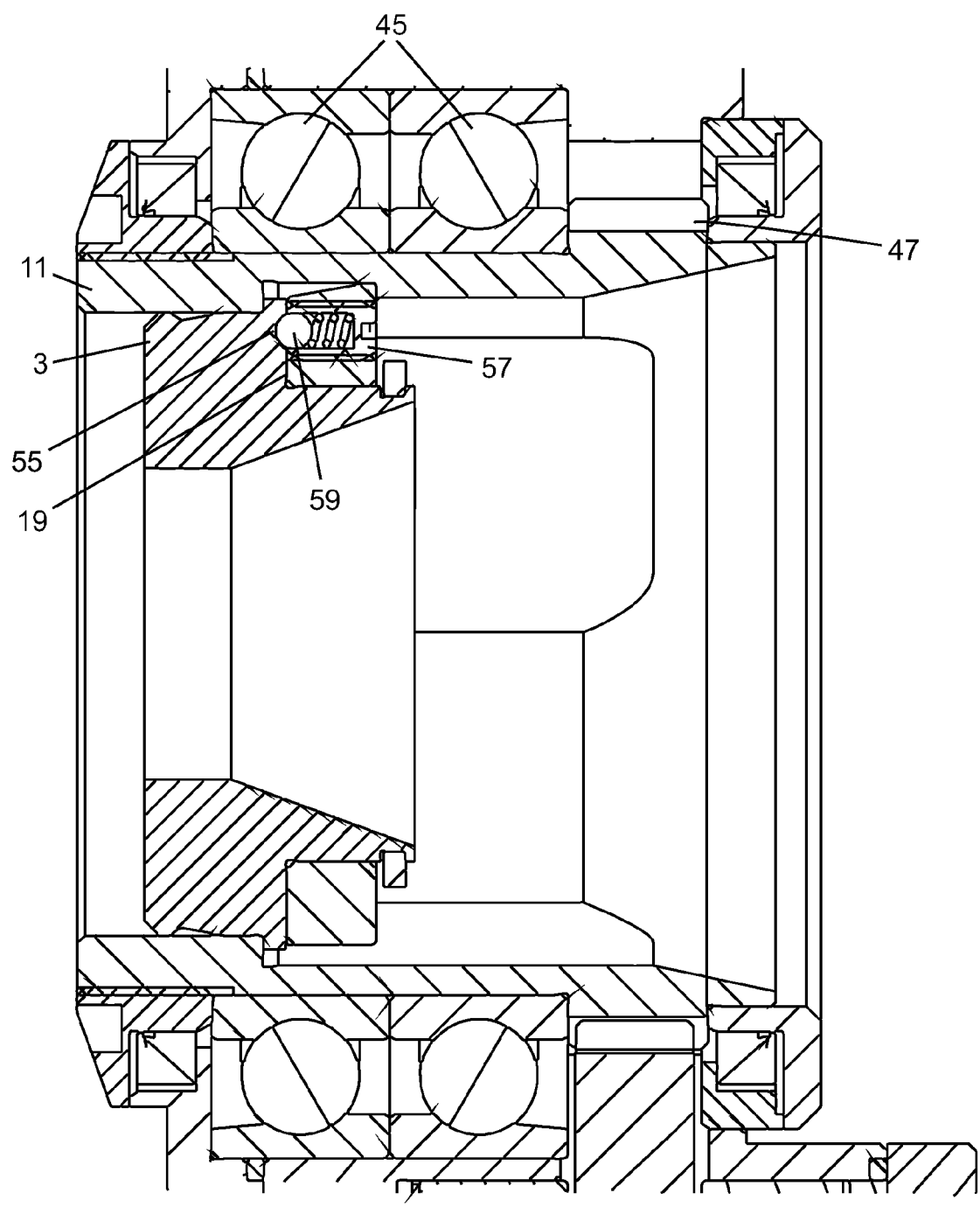

FIG. 13 depicts an alternative anti-twist protection of bayonet ring 23 in a longitudinal section. In this exemplary embodiment, at least one countersink 55 is configured in flange surface 19 of whirling ring 3. Within bayonet ring 23, in place of or in addition to clamping bolts 29 (not depicted in FIG. 13) at least one spring-action compression piece 57 is arranged, whose ball 59 springs into countersink 55 as soon as bayonet ring 23 has been rotated relative to whirling ring 3 to the point that the bayonet-type connection is closed. In this way, haptic feedback is obtained that the bayonet-type connection is closed and at the same time that the bayonet-type connection is protected against unintended release.

The invention claimed is:

1. A thread whirling device comprising:
   a housing;
   a driven, hollow spindle rotatably supported within the housing,
   a whirling ring that is arranged in the hollow spindle, and
   a bayonet ring rotatably supported on the whirling ring and including at least one lug, the bayonet ring joining the hollow spindle and the whirling ring to each other by a bayonet connection;
   wherein fasteners are disposed within internal threads in the bayonet ring;
   wherein when turned the fasteners contact the whirling ring and generate a separating force that separates the whirling ring from the bayonet ring, such that a first contact face on the whirling ring presses against a complementary first contact face within a groove in the hollow spindle, and such that a second contact face on the bayonet ring presses against a complementary second contact face within the groove in the hollow spindle.

2. The device as recited in claim 1, wherein the at least one lug projects outward from the bayonet ring, and the at least one lug forms the bayonet connection with at least one correspondingly shaped groove in the hollow spindle.

3. The device as recited in claim 1, wherein the bayonet ring includes a safety ring that is positioned on the whirling ring.

4. The device as recited in claim 1, wherein the whirling ring or the bayonet ring have a front-end driver means, and the whirling ring is held by a tool via the driver means and can be rotated relative to the hollow spindle.

5. The device as recited in claim 4, wherein the driver means are configured as cylindrical, single truncated-cone-shaped recesses and/or double truncated-cone-shaped recesses, and the recesses cooperate with correspondingly shaped carriers on a tool.

6. The device as recited in claim 1, wherein the whirling ring is positioned within the hollow spindle via cylindrical contact surfaces, truncated-cone-shaped contact surfaces, and/or a planar flange surface.

7. The device as recited in claim 1, wherein the whirling ring is connected to the hollow spindle in a form-locking and rotationally fixed manner via a polygon connection.

8. A tool for installing a whirling ring in a hollow spindle of the thread whirling device in accordance with claim 1, comprising multiple carriers that are arranged on a front end and a means for grasping the tool.

9. The tool as recited in claim 8, wherein the carriers are configured as spring pins, and the spring pins have a clamping element, in particular an O-ring or diameter enlargements that are elastic in the radial direction.

10. The tool as recited in claim 8, wherein the tool has longitudinal boreholes, and a hole pattern of the longitudinal boreholes corresponds to a hole pattern of the clamping bolts in the bayonet ring or the whirling ring, provided that the whirling ring is connected to the tool by the driver means.

11. The device as recited in claim 2, wherein multiple clamping elements are provided on the whirling ring, the bayonet ring, and/or the hollow spindle in order to brace the whirling ring and the hollow spindle against each other.

12. The device as recited in claim 3, wherein multiple clamping elements are provided on the whirling ring, the bayonet ring, and/or the hollow spindle in order to brace the whirling ring and the hollow spindle against each other.

13. The device as recited in claim 1, wherein the groove is a circumferential groove.

\* \* \* \* \*